April 20, 1943.  R. G. LE TOURNEAU  2,317,070
SHAFT AND HUB CONNECTION
Filed Dec. 23, 1941

INVENTOR
R. G. LeTourneau
BY
ATTYS

Patented Apr. 20, 1943

2,317,070

UNITED STATES PATENT OFFICE 2,317,070

SHAFT AND HUB CONNECTION

Robert G. Le Tourneau, Peoria, Ill., assignor to R. G. Le Tourneau, Inc., a corporation Application December 23, 1941, Serial No. 424,145

1 Claim. (Cl. 287—53)

This invention relates in general to a structural arrangement for connecting or mounting a shaft in a wheel or gear hub in rigid, centered, and positive driving relation; and in particular the invention contemplates the provision in a spline shaft and hub connection of a unique taper shaft and spline assembly.

The principal objects of the invention are to provide a shaft and hub connection which may be manufactured expeditiously; to provide a connection which assures proper centering of the shaft in the hub in driving relation; and to provide a connection in which the parts do not tend to freeze when assembled, thus permitting ready separation of the shaft from the hub when necessity demands.

A further object of this invention is to provide a hub and shaft connection which when assembled includes cooperating complementary straight spline driving portions on the shaft and hub intermediate the ends of the latter, and inwardly facing taper portions of unbroken configuration on the shaft beyond opposite ends of said straight spline portions and engaging the hub whereby to assure accurate centering of the shaft in the hub, while permitting said straight spline portions to have a relatively easy or loose fit.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
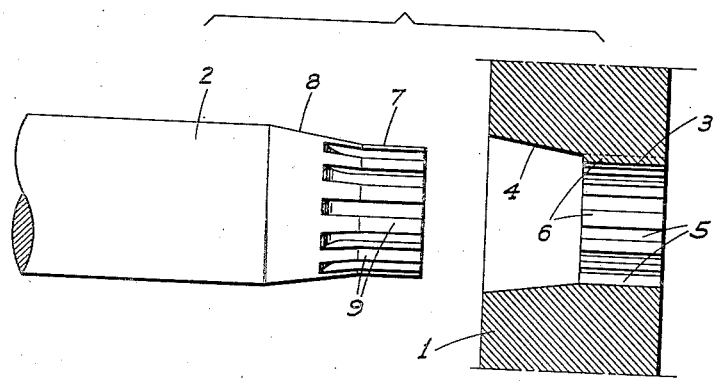
Figure 1 is an elevation of the hub and shaft connection; the shaft being shown separated from the hub, and the latter being shown in section.
Figure 2:
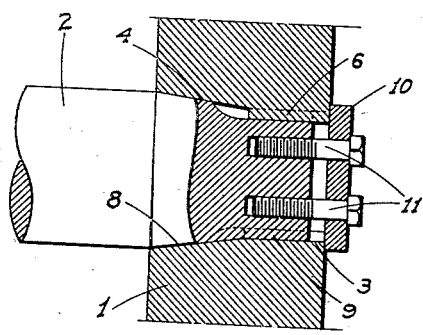
Figure 2 is a sectional elevation of the hub and shaft assembled and including one form of retaining means.

Referring now more particularly to the characters of reference on the drawing, and at present to Figs. 1 and 2, the numeral 1 indicates the hub of a wheel, gear or the like adapted to be mounted in driven relation on one end of a shaft 2.

The hub includes a central bore which for a certain distance from one end of the hub is of constant diameter, this portion being indicated at 3 and hereinafter identified as the "straight portion" of the hub bore, and said portion extends approximately half way through the hub. The other portion of the bore, indicated at 4, increases in diameter from its inner end outward whereby to provide a conical taper; this portion of the bore hereinafter being identified as the "taper portion" of the hub bore.

The straight portion 3 of the bore of hub 1 is initially of lesser diameter than the small or inner end diameter of the taper portion 4 of said bore; this being to permit spline grooving 5 of, and production of splines 6 in, the straight portion 3 without the grooving tool cutting into the taper portion 4.

Immediately inward from its outer end shaft 2 is formed with a straight portion 7, and inwardly of portion 7 with a taper portion 8; the portions 7 and 8 matching the hub portions 3 and 4. The straight portion 7 of the shaft is formed with splines 9 for complementary cooperation with the hub splines 6 whereby to provide positive driving engagement between the hub and shaft. However, the fit between the splines 6 and 9 is easy or relatively loose, whereby after assembly and considerable use the splines do not freeze together, and thus if necessary the hub can be removed from the shaft without difficulty.

Figure 3:
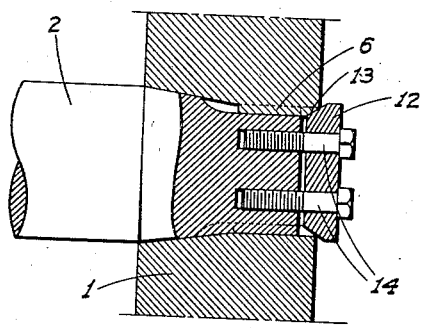
Figure 3 is a similar view but shows a different form of retaining means.
Figure 4:
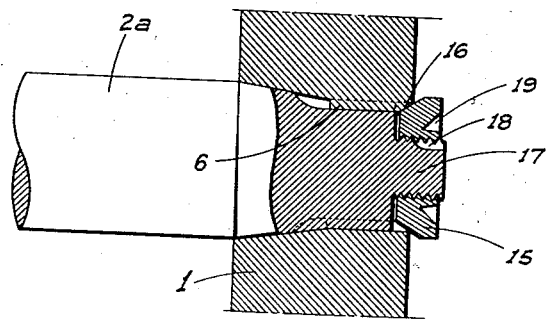
Figure 4 illustrates a third type of retaining means.

The straight hub bore 3 is longer than the straight shaft portion 7, so that when the shaft and hub are assembled the outer end of the shaft portion terminates short of the outer end of the hub bore, as is clearly shown, and the shaft and hub are secured in close frictional engagement by retaining means, such as are shown in Figs. 2-4 inclusive.

In Fig. 2, the retaining means comprises a head or end plate 10 of greater diameter than the bore overlying the end of the latter and abutting against the outer end of the hub. Diametrally opposed tension or draw bolts 11 extend through plate 10 and are threaded into the adjacent end of shaft 2. In this form of the retaining means, centering of the shaft on the hub is accomplished solely by virtue of the cooperating taper portions 4 and 8 of the hub and shaft respectively.

In Fig. 3, the retaining means comprises a taper head 12 which frictionally engages in the outer end of the hub bore; the adjacent ends of the hub splines 6 being matchingly tapered as at 13. This head 12 is secured in connection with the adjacent end of the shaft by diametrally opposed draw bolts 14 which extend through said head and into threaded engagement with the shaft. In this embodiment it will be noted that the taper head 12 as it engages the tapered ends of splines 6 provides a further centering means for the shaft and beyond the end of the loose fitting splines opposite from the taper portions 4 and 8 of the shaft.

In Fig. 4, the retaining means likewise includes a taper head indicated at 15 which cooperates with the tapered end 16 of the hub splines, but here the taper head is secured with the shaft as follows:

The adjacent end of the shaft 2a includes an axially projecting threaded stud 17; the head 15 having a central threaded bore and said head being rethreaded onto the stud 17 to an extent to draw the shaft into the desired frictional engagement in the hub bore.

The stud 17 is formed with a longitudinal groove 18 while the head 15 has an annular groove 19 in the outer face thereof close to its threads whereby with a suitable tool a portion of the head 15 radially inward of groove 19 may be deformed into groove 18, preventing undesired backing off or unscrewing of head 15.

By forming the hub and shaft connection as above described, the female spline in the hub can be cut by means of a conventional type broach bar, and the male spline on the shaft can be cut in a conventional hobbing machine, milling machine, or shaper. Further, by virtue of the use of cooperating taper portions on the shaft and hub beyond one end of the complementary straight splines, and the taper hub engaging head beyond the other end thereof, positive centering of the shaft in the hub is accomplished without the need of the complementary splines being other than a relatively loose fit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a shaft and hub connection, the hub having a bore, said bore having a single straight portion and intermediate its ends, the bore at opposite ends of said straight portion increasing in diameter toward the corresponding ends of the hub as conical tapers, one end of the shaft projecting into said bore from one end and being formed with an integral taper and a straight portion no longer than the straight portion of the bore matchingly engaging the adjacent bore taper and said straight portion of the bore respectively, complementary straight splines and grooves cut in the straight portions of the hub and shaft, an initially separate taper head seated in the other end of the bore in matching engagement with the other bore taper, and means removably connecting said head and the adjacent end of the shaft in tensioned and rigid relation.

ROBERT G. LE TOURNEAU.